H. STRANZENBACH.
INSECT CATCHER.
APPLICATION FILED MAR. 23, 1909.
935,428.
Patented Sept. 28, 1909.
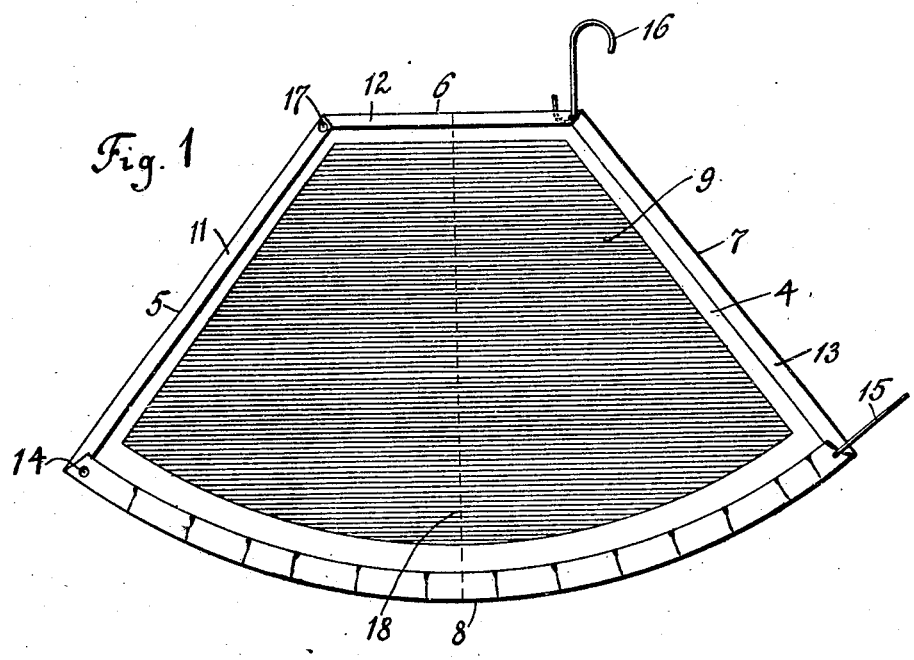
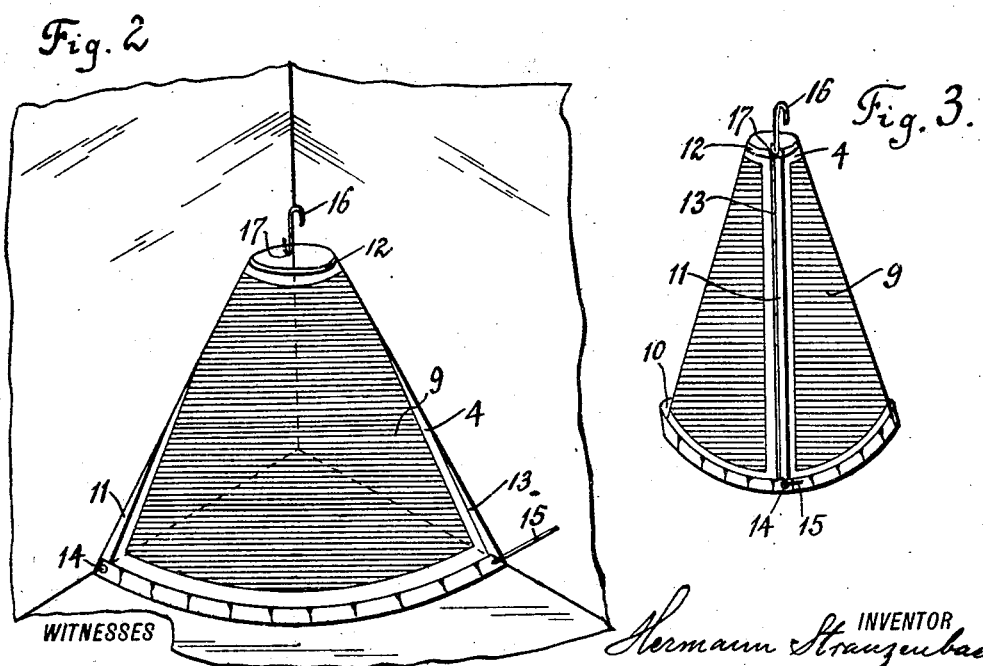

UNITED STATES PATENT OFFICE.

HERMANN STRANZENBACH, OF NEW YORK, N. Y., ASSIGNOR TO EXCELSIOR FLY CATCHER MFG. CO., OF NEW YORK, N. Y., A CORPORATION OF NEW YORK.

INSECT-CATCHER.

935,428.  Specification of Letters Patent.  Patented Sept. 28, 1909.

Application filed March 23, 1909. Serial No. 485,189.

*To all whom it may concern:*

Be it known that I, HERMANN STRANZENBACH, a subject of the German Emperor, and resident of the city of New York, in the county of New York and State of New York, have invented certain new and useful Improvements in Insect-Catchers, of which the following is a specification.

The present invention relates to insect catchers, and more particularly to that class of the same in which there is employed an adhesive or sticky material, such as a slow drying varnish, or similar substance, for catching the insects.

The object of the invention is to provide an insect catcher made of a sheet of material, such as paper, coated with adhesive material, which can be laid flat upon a support, such as a table, and being provided with means for securing together the two upper corners of the sheet, whereby said sheet may be placed against the wall to present an extended surface, there being also means on said sheet, whereby the same may be bent to form a cone-like structure, to be placed upon a support or to be suspended from a fixture, if so desired.

Another object of the invention is to provide an insect catcher having means for preventing the sticky or adhesive material thereof from running over the edges of the same, and preventing thereby such sticky or adhesive material from soiling the locality, where the catcher is placed or hung up.

A still further object of the invention is to provide an insect catcher which can be easily and cheaply manufactured, and which can be handled without soiling the hands of the user.

Other objects and advantages of the invention will be apparent from a reading of the specification and an examination of the drawings, forming part of the present application for Letters Patent.

The invention is illustrated in the accompanying drawings, in which—

Figure 1 is an elevation of an insect catcher, constructed in accordance with the present invention, in its flat form, Fig. 2 a perspective view of the device, two corners of the same being fastened together so as to be capable of being leaned against the wall, and Fig. 3 is a perspective view of the device as it appears when being formed into a cone-like and self supporting structure, to be placed upon a support or to be suspended from a fixture.

In the drawings, the numeral 4 denotes a sheet of paper or other similar material, of which the insect catcher is formed, and being, preferably, of such a thickness so as to be self supporting, that is to be practically rigid when bent so as to form a cone-like structure. This sheet is, preferably, cut in the shape of a four-sided figure, of which three sides, that is sides 5, 6 and 7 form straight lines, while the fourth side, that is side 8, forms an arc; in other words, the sheet is cut in the form of a sector, having a portion cut off where the radii of its circle meet, whereby a frustum of a cone may be formed when the sheet is bent so as to cause the sides 5 and 7 to meet.

A portion of one of the faces of the sheet is covered with the usual sticky substance, indicated at 9, which adhesive material, however, does not extend to the edges of the sheet, whereby blank spaces are left adjacent to said edges, so that the sheet can be handled without soiling the hands. The edge 8, which forms an arc, is folded upwardly, providing thereby a trough 10 when the sheet is bent so as to form a frustum of a cone, which trough serves for preventing the sticky substance from running off said edge in case the same should for any reason melt. In a similar manner are the edges 5, 6 and 7 folded upwardly, as shown at 11, 12 and 13 for preventing the sticky substance from running off at said edges when the device is used as a flat sheet, or when placed against a wall.

In one of the lower corners of the device is formed a hole or aperture 14, adapted to be engaged by a wire 15, secured in any suitable manner to the other lower corner of the sheet, and in a similar manner is provided upon one of the upper corners of the sheet a hook 16, preferably made of wire, which may engage the hole or aperture 17 in the other of the upper corners of the device, and provides at the same time means, whereby the device may be suspended, if desired. It is, of course, obvious that other coöperating locking means may be provided for keeping the sheet in its cone-like shape without departing from the scope of the invention.

In packing the device for transportation, the sheets may be arranged in pairs face to face, that is with their sticky faces joined, or each sheet may be folded on its center line, indicated at 18, so that its sticky surface is properly protected. Thus, obviously, the sheets may be packed in suitable packages without the danger of sticking or adhering together.

As mentioned hereinbefore, the sheets may be placed upon a surface with their sticky surfaces upward, presenting thereby a large surface for the flies to alight upon. The upturned portions 10, 11, 12 and 13 form a rim so that the adhesive substance cannot run off the edges of the sheet. In engaging the hook 16 with the hole or aperture 17 in one of the upper corners of the sheet, a structure is provided which may be either leaned against a wall or placed in a corner, in which case, of course, the upturned edges will prevent the sticky surface from soiling the walls and the support. If at the same time the wire 15 is engaged with the hole 14 in one of the lower corners of the sheet, a self-supporting frustum of a cone is formed, which may be placed upon a support or may be suspended by means of the hook 16.

What I claim is:

In an insect catching device, the combination with a sheet of paper forming a four sided figure, the base of which is arc-shaped and all the edges of which are upturned, of an adhesive material covering said sheet so as to leave blank spaces adjacent to the edges thereof, and means for securing together the two upper corners of said sheet, whereby the device may be leaned against a wall, the upturned portions of the edges preventing the contact of the sticky surface with the wall and the support, respectively.

Signed at New York, in the county of New York and State of New York, this 19th day of March, A. D. 1909.

HERMANN STRANZENBACH.

Witnesses:
SIGMUND HERZOG,
S. BIRNBAUM.